United States Patent [19]
Weddleton

[11] 3,808,535
[45] Apr. 30, 1974

[54] WIDE-CHART DISPLAY WITH SMALL-SPAN OSCILLOGRAPHIC RECORDING INSTRUMENTS

[75] Inventor: Richard L. Weddleton, San Diego, Calif.

[73] Assignee: Hewlett-Packard Company, Palo Alto, Calif.

[22] Filed: June 25, 1973

[21] Appl. No.: 373,595

[52] U.S. Cl............................ 346/1, 324/131, 346/44, 346/35
[51] Int. Cl. ................................................ G01d 3/10
[58] Field of Search .............. 346/1, 35, 65, 66, 44, 346/45, 49; 324/113, 114, 131

[56] References Cited
UNITED STATES PATENTS

| | | | |
|---|---|---|---|
| 2,448,461 | 8/1948 | Postal | 324/131 X |
| 2,457,214 | 12/1948 | Doll et al. | 346/65 X |
| 3,750,187 | 7/1973 | Keefer | 346/49 |

Primary Examiner—Joseph W. Hartary
Attorney, Agent, or Firm—Stephen P. Fox

[57] ABSTRACT

A method is provided for producing a wide-chart recording on a multi-channel oscillographic recording instrument. The method includes the steps of amplifying an input signal, and using a zero-suppression capability of the preamplifiers in the recording instrument to offset the amplified signal by different amounts in each channel. The display in each channel is then electrically limited to a given voltage range so that each channel will display only a portion of the signal, adjacent channels displaying corresponding adjacent portions of the signal. For the case of a two-channel display a variant of the method provides that the offset of the signal be accomplished using the position adjust controls of the servo-amplifiers in the recording instrument. In both cases, a display is printed which has the width of a wide-chart recording but has a higher frequency response than is normally feasible with wide-chart stylus recording instruments.

6 Claims, 11 Drawing Figures

WIDE-CHART DISPLAY WITH SMALL-SPAN OSCILLOGRAPHIC RECORDING INSTRUMENTS

BACKGROUND OF THE INVENTION

This invention is concerned generally with strip chart recorders, and more particularly with a method for utilizing several channels of a multi-channel galvanometer-type recorder to produce a wide-chart recording. In one familiar type of strip chart recorder a strip of recording paper is mechanically advanced at constant speed past a track oriented perpendicular to the direction of advancement of the paper. A recording pen, or stylus, which is driven back and forth along the track by a system of belts and pulleys serves to make the record. Typically, the paper advances along the $x$-axis (the ordinate) while the motion of the pen is along the $y$-axis (the abcissa). Recorders of this belt-and-pulley type are capable of printing on wide charts, for example, chart widths in the range of 5 inches to 10 inches. Consequently, it is possible to display a large amplitude signal in such a way that even small variations in the signal will be visible to the eye. Unfortunately, the frequency response of these devices is limited by the mechanical belts and pulleys which drive the pen, a typical frequency response being of the order of 1.0–1.5 Hertz full scale. The term frequency response is used here to mean the signal frequency at which the stylus will no longer produce a full scale record in response to a full scale signal.

It is possible to overcome the frequency limitations mentioned above by using an oscillographic strip chart recorder in which the pen is driven directly by a galvanometer, rather than by a belt and pulley system. The frequency response of these devices is typically 60 Hertz full scale. However, a disadvantage of galvanometer type recorders is that they can produce only very narrow recordings, the total range of the ordinate being typically limited to 2 inches. The width limitation arises because the recording pen is driven by the galvanometer in a pendulum fashion, the pen being attached to one end of an arm assembly which is itself driven by the galvanometer. Since the angular sweep of the galvanometer extends only through a limited range, it would be necessary to provide an extremely long arm in order to span a wide chart. Even if the practical difficulties in providing such a long arm were resolved, the inertia inherent in the long arm assembly would act to limit the frequency response of the recorder. In summary, it is characteristic of galvanometer type recorders to have a high frequency response, but to be limited to producing very narrow recordings.

It would thus be desirable to have a strip chart recorder which has a higher frequency response than is characteristic of a belt and pulley recorder, but which can produce wide chart recordings.

SUMMARY OF THE INVENTION

In accordance with the illustrated preferred embodiments of the present invention, there is provided a method of operating a multi-channel galvanometer-type strip chart recorder which will enable the user to produce a wide chart recording. One of the embodiments of the method utilizes a multi-channel galvanometer type strip chart recorder in conjunction with a number of input preamplifiers, one preamplifiers corresponding to each channel. When it is desired to produce a wide-chart display of an input signal, the signal is applied in parallel to the input terminals of several of the preamplifiers. Suppose, for example, that it is desired to produce an output display whose width is equal to twice the width of a single channel. In this case, the input signal is applied in parallel to the input of two preamplifiers corresponding to two adjacent channels. Each of the two preamplifiers is adjusted so that in response to a "full scale" input signal (a signal which would ordinarily register full scale on a single channel), the preamplifier output is a voltage equal to twice the voltage which would have driven a single channel full scale. Embodied in each preamplifier (or, alternatively in each of several servo-amplifiers which drive the recording pen galvanometers) is a sharp electronic limiter which chops the signals so that in the ordinary operating mode only a part of the signal would appear on a full scale display on each channel, the same part of the signal appearing on each channel. According to the present method, however, a further adjustment is made using a zero suppression capability (sometimes called a channel zero position) in the preamplifiers. In particular, the zero suppression is used to offset the pen driving voltage of one channel by a positive amount equal to half of the voltage which the preamplifier would output in response to the usual "full scale" input voltage. The zero suppression capability of the other amplifier is used to offset the second pen driving voltage by a like amount in the negative direction. The result is that the first channel will display only the "upper half" of any input signal, while the second channel will display only the "lower half" of the same signal. The method further provides that the charts corresponding to these channels be physically adjacent, so that at the junction of the two charts the lower part of one graph smoothly interconnects with the upper part of the other graph. In practice, the charts may be displaced from each other by some small integral number of chart divisions, within which chart one stylus is stopped by its limiter and the other stylus begins its corresponding response. The visual appearance of the display will then be similar to that of one wide graph, wherein a full scale signal is displayed across the width of two adjacent strip charts.

If the recorder has more than two channels an analogous method may be used to produce an even wider display. If there are N channels, then each preamplifier is set to output N-times the ordinary full scale output voltage. The zero suppression on each preamplifier is then set to bias the output signals so that each channel displays a different portion of the signal, the width of each of these portions being 1/N times the total signal width. Adjacent channels again display adjacent portions of the signal, so that the display will have a total width equal to N-times the width of one strip chart. The full scale frequency response is approximately that of a single channel divided by N. For example, use of five channels will produce a record approximately ten inches wide with a full scale frequency response of approximately 12 Hertz, an order of magnitude greater than that of a conventional ten inch stylus recorder.

It should be noted also that such a method permits flexible operation of the recorder. The user, at his option, can use the recorder to produce single width, double width, triple width, etc., records alternatively or simultaneously in any combination afforded by the number of channels of the recorder.

In the case of a two-channel recorder, a wide chart recording may be obtained in accordance with another embodiment of the present method, by using bias (usually called "position") controls on the servo-amplifiers which drive the pen galvanometers. In this case, the same input signal is applied to both preamplifiers, which again are set to output twice the usual full scale output voltage. Then the position control adjustments on the servo-amplifiers are used to offset the recording on one graph by a positive amount equal to half the full scale amount and to offset the other graph by a corresponding amount in the negative direction. The resulting display will have a full scale width equal to two individual chart widths.

DESCRIPTION OF THE INVENTION

Figure 1:
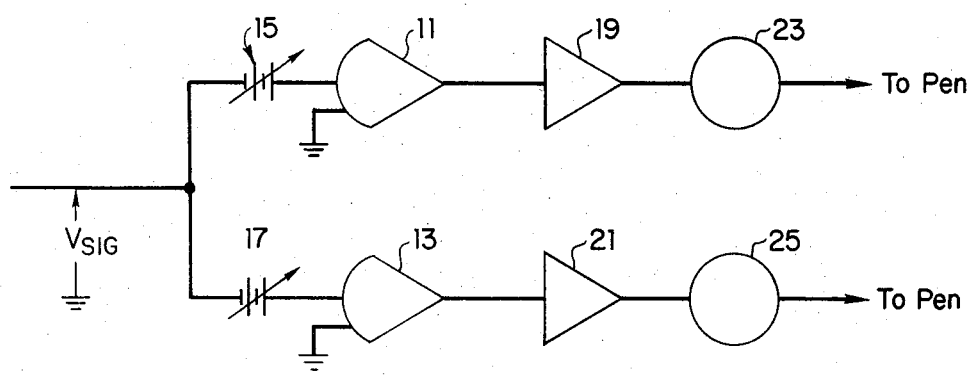
FIG. 1 is a schematic diagram illustrating the use of the present method to produce a wide-chart recording in two channels of an oscillographic recorder.
Figure 2A:
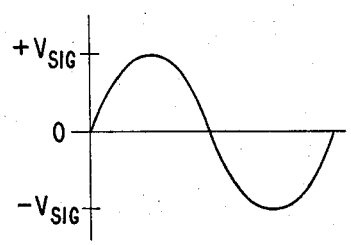
FIGS. 2A–2C illustrate how the present method is used to display only the upper half of an input signal across the width of one chart.
Figure 2B:
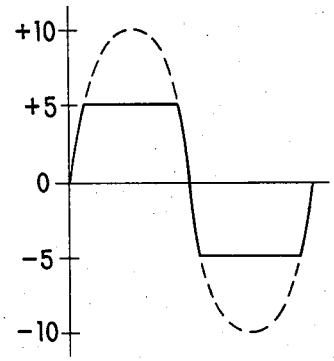
Figure 2C:
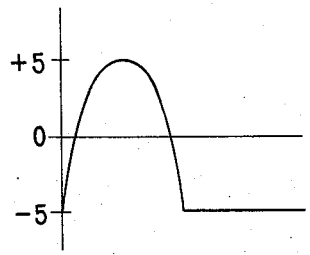

In FIG. 1 there is shown an input signal designated $V_{SIG}$ which is to be displayed on a wide chart display using two channels of a strip chart recorder. The input signal is applied in parallel to one preamplifier 11 and another preamplifier 13. These preamplifiers may be, for example, of the type exemplified by the Hewlett-Packard Model 17401A. Both preamplifiers include zero-suppression (or zero position) features which are indicated schematically by the variable voltage sources 15 and 17. The zero suppression feature can be used to electrically offset, or bias, the input signal voltage which each preamplifier sees. Typically, the amount of the bias is simply adjusted using a dial on the front of the preamplifier. The outputs of the preamplifiers 11 and 13 are electrically interconnected to the input terminals of two servoamplifiers, 19 and 21, respectively. The outputs of the servoamplifiers 19 and 21 are used to drive two galvanometers 23 and 25, respectively, each galvanometer serving to drive a pen, or stylus, (not shown) which records data on one channel of the strip chart recorder. The basic method of the present invention may be understood by reference to FIGS. 2A-2C, 3A-3C and 4, in which it is assumed for illustrative purposes that a two-channel recording is to be produced. FIG. 2A shows a typical input signal which is applied to preamplifier 11 corresponding to a first channel of the recorder; as an example, a sine wave of amplitude $V_{SIG}$ volts is shown. FIG. 2B shows the output of preamplifier 11 when the zero suppression bias voltage is set at zero volts. It is assumed for purposes of this example that a preamplifier output of 5 volts would ordinarily produce a full scale display on one channel. The dotted curve indicates that the output of the preamplifier 11 has an amplitude twice that of the "ordinary full scale output," i.e., an amplitude of 10 volts in the illustrated example. However, as indicated by the solid curve, the actual output voltage is chopped by the preamplifier so that only that part of the signal up to ±5 volts appears at the output. Finally, FIG. 2C shows the output of preamplifier 11 when the zero suppression bias voltage is adjusted to offset the output voltage by −5 volts.

Figure 3A:
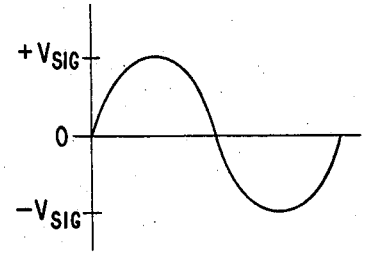
FIGS. 3A–3C illustrate how the present method is used to display only the lower half of an input signal across the width of another chart.
Figure 3B:
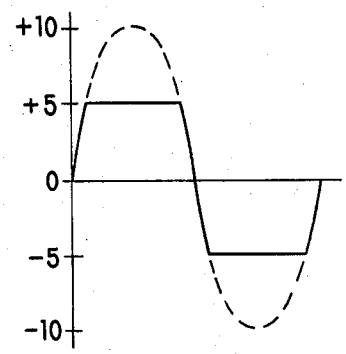
Figure 3C:
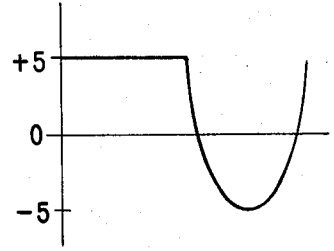

Under these operating conditions, only one part of the input signal (in this example the positive part) will be seen by the pen-driving galvanometer 23 (in FIG. 1). Thus, the pen driven by preamplifier 11 and servoamplifier 19 will make a recording on one channel which corresponds to only the positive part of the input signal. By providing that the output of preamplifier 11 be limited appropriately (±5 volts in the example), the record on this channel can be made to correspond exactly to the full scale width of the channel. FIG. 3A shows the input signal to preamplifier 13, which is, in fact, the identical signal that is applied to preamplifier 11. The solid curve in FIG. 3B shows the output of preamplifier 13 also has an amplitude twice that of the "ordinary full scale output," and is chopped in an identical manner to the output of preamplifier 11 shown in FIG. 2B. FIG. 3C, however, shows the output of the preamplifier 13 when a zero suppression bias voltage (+5 volts in the example) is used to offset the output in a positive direction. Under these conditions, the pen driving galvanometer 25 will see a maximum signal level corresponding to that part of the input signal which is seen as a zero signal level by the other galvanometer 23. The pen in this channel will thus record only that part of the signal corresponding to the negative part of the input signal. The output limiting again ensures that the display will correspond exactly to the width of the channel.

Figure 4:
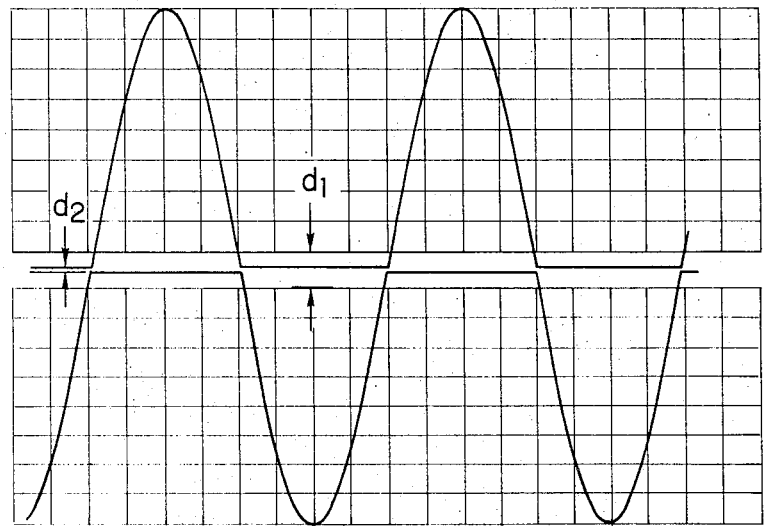
FIG. 4 is a two-chart display produced in accordance with the present method.

FIG. 4 illustrates the conjunction of the recordings on the two channels illustrated in FIGS. 2 and 3 to produce a record which is two channels wide. The two channels are positioned adjacent to one another in such a way that the distance $d_1$ between the bottom edge of the upper channel and the top edge of the lower channel is equal to some small integral number of divisions of the recording charts. This positioning facilitates visual reading of the graph produced. FIG. 4 also illustrates an additional aspect of the present method which is necessary for the practical production of wide chart graphs; i.e., to accommodate the finite size of the pen tips there must be a small displacement between the lowermost travel of the pen writing the upper channel and the uppermost travel of the pen writing the lower channel. This displacement is labeled $d_2$ in FIG. 4, and is typically about one thirty-second inch. To achieve the displacement in practice, a position limit control on the servoamplifier 19 (in FIG. 1) is adjusted to offset the display in the corresponding channel in a negative direction, by a distance of $d_2/2$, while a similar position limit control on the servoamplifier 21 (in FIG. 1) is adjusted to offset the display driven by that servoamplifier by a distance of $d_2/2$ in a positive direction.

Figure 5:
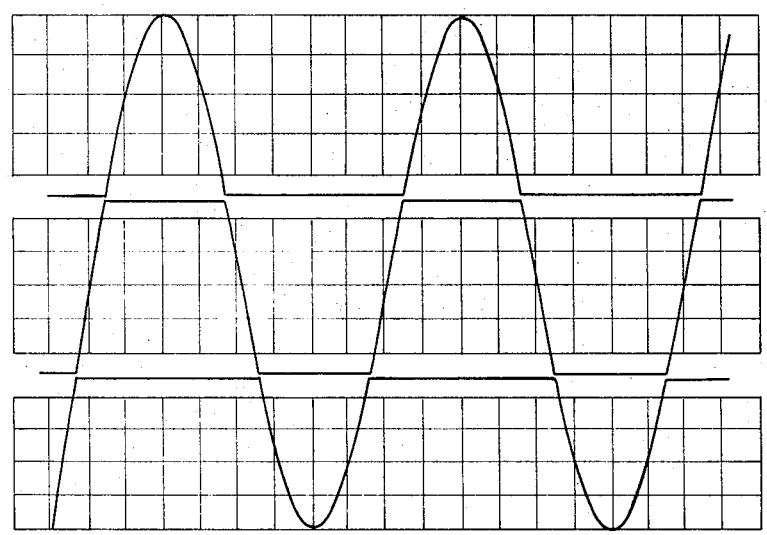
FIG. 5 illustrates a wide chart display using three charts, in acocrdance with the present method.

In FIG. 5, there is shown a display using three charts of a multi-channel recorder. The overall signal has been amplified by an amount equal to three times the amplification required to produce a full scale display of the input signal on one chart. In a manner analagous to that described above in connection with the two-channel displays, the signals in each channel are offset and chopped so that the upper third of the signal is displayed on the uppermost chart, the middle third of the signal is displayed on the middle chart, and the lower third of the signal is displayed on the lowermost chart. In a similar manner, the signal may be displayed on a wide chart display including a larger number of charts.

Figure 6A:
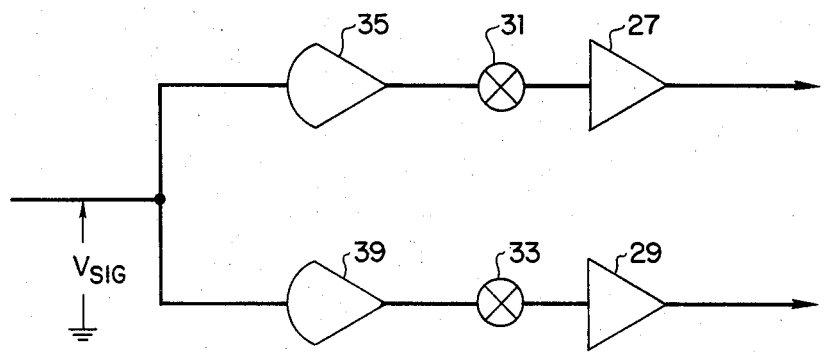
FIGS. 6A and 6B are schematic diagrams illustrating the use of variations of the present method to produce a two-chart recording.

In FIG. 6A there are shown two servoamplifiers 27 and 29, each of which drives the writing mechanism in one channel of a two channel recorder. Also shown are position controls 31 and 33 associated with the servoamplifiers 27 and 29 respectively. Typically, each position control is a potentiometer which is capable of offsetting the display in the corresponding channel by an amount about equal to the width of one chart. Thus, an input signal to be displayed can be amplified by twice the amount required for a full scale display on one channel, and then the position controls 31 and 33 can be used to offset the signal in each channel in opposite directions, thereby achieving a two-channel wide chart display without any zero suppression in the preamplifiers 35 and 39.

Figure 6B:
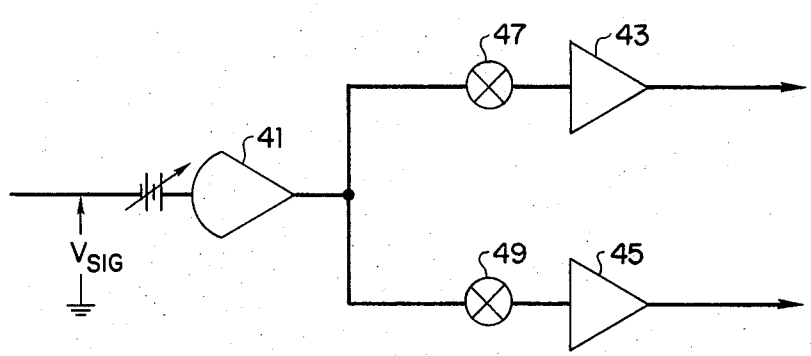

FIGS. 6B illustrates an embodiment of the present invention using the principle shown in FIG. 6A, but where only one preamplifier 41 is used. The amplitude of the output of preamplifier 41 is again equal to twice the amplitude that would provide a full scale display on one chart, and is applied in parallel to the servoamplifier 43 and 45. The position controls 47 and 49 are then used to offset the signal in each channel as was explained above in connection with FIG. 6A.

I claim:
1. A method for producing a wide chart recording on a plurality of display charts associated with a plurality of signal processing channels in an oscillographic stylus type multichannel strip chart recorder, each channel including amplification means and associated writing means, said method comprising the steps of:
   positioning the plurality of output display charts adjacent to one another;
   applying a single input signal to be displayed in parallel to the input of each channel desired to be used in the wide chart display;
   amplifying the signal in each channel by an amount equal to N-times the amount of amplification which would produce a full scale recording of the input signal on one channel, N being equal to the number of display channels desired to be used in the wide-chart display; and
   offsetting the signal in each channel so that the maximum signal level seen by the writing means associated with any particular channel corresponds to the zero level signal seen by the writing means associated with the next adjacent channel, the entire signal being thereby displayed in portions, adjacent portions of the signal being displayed on corresponding adjacent display charts.

2. A method as in claim 1 wherein:
   the step of amplifying the signal in each channel comprises the step of preamplifying the signal in each channel separately, and the step of power amplifying the signal in each channel; and
   the step of offsetting the signal in each channel comprises the step of offsetting the signal during the preamplifying step.

3. A method as in claim 2 wherein the step of offsetting the signal during the preamplifying step comprises the step of offsetting the signal by electrically biasing the signal.

4. A method as in claim 1 wherein:
   N is equal to two (2);
   the step of amplifying the signal in each channel comprises the step of preamplifying the signal in each channel separately, and the step of power amplifying the signal in each channel; and
   the step of offsetting the signal in each channel comprises the step of offsetting the signal during the power amplifying step.

5. A method as in claim 1 wherein:
   N is equal to two (2);
   the step of amplifying the signal in each channel comprises the step of preamplifying the signal in both channels together, and the step of power amplifying the signal in each channel; and
   the step of offsetting the signal in each channel comprises the step of offsetting the signal during the power amplifying step.

6. A method as in claim 1 wherein the step of positioning the plurality of output display charts adjacent to one another comprises the step of positioning the plurality of display charts so that the distance between adjacent charts is equal to a small integral number of chart divisions.

* * * * *

UNITED STATES PATENT OFFICE
CERTIFICATE OF CORRECTION

Patent No. 3,808,535          Dated April 30, 1974

Inventor(s) Richard L. Weddleton

It is certified that error appears in the above-identified patent and that said Letters Patent are hereby corrected as shown below:

Column 4, line 58, cancel "$d_2 12$" and substitute -- $\dfrac{d_2}{2}$ --.

Signed and sealed this 27th day of August 1974.

(SEAL)
Attest:

McCOY M. GIBSON, JR.
Attesting Officer

C. MARSHALL DANN
Commissioner of Patents